Figure 3:
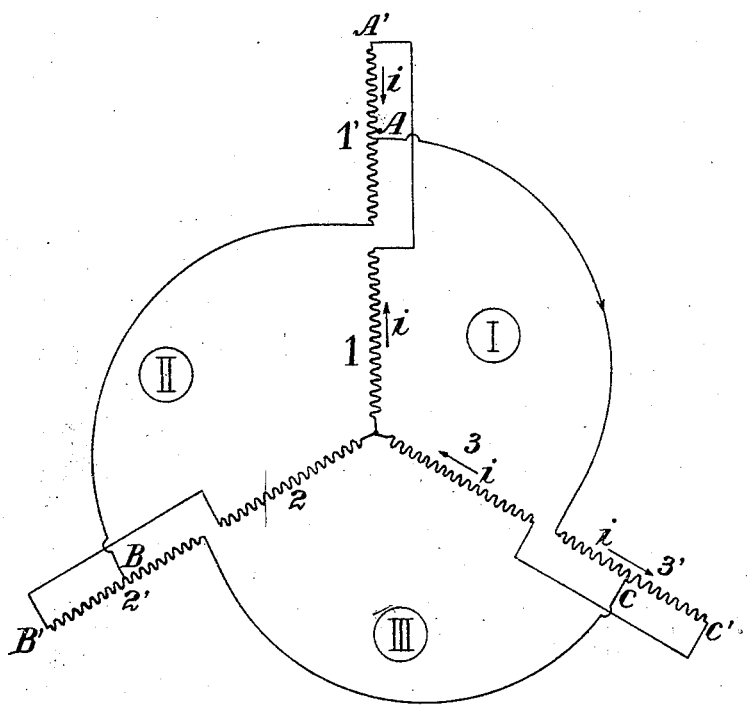

Aug. 28, 1928.
C. SHENFER
1,682,430
ROTOR WINDING FOR ASYNCHRONOUS MOTORS WITHOUT STARTERS
Filed Jan. 2, 1923   2 Sheets-Sheet 1
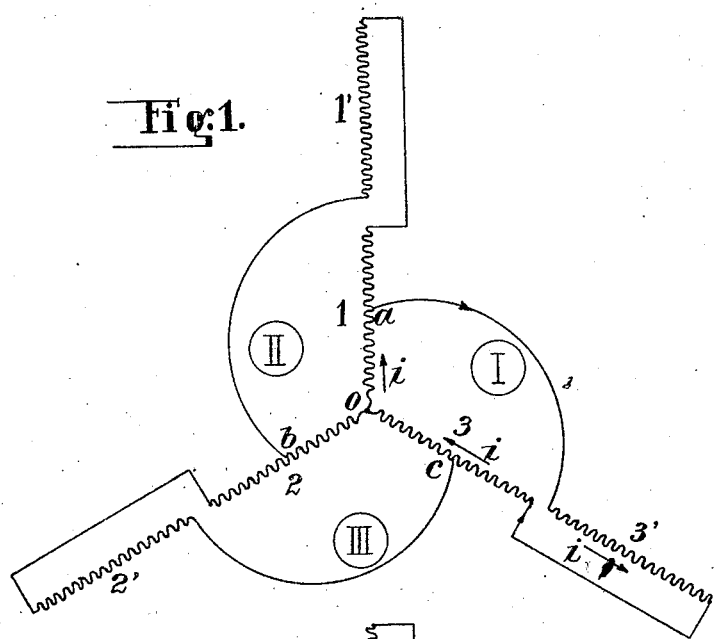
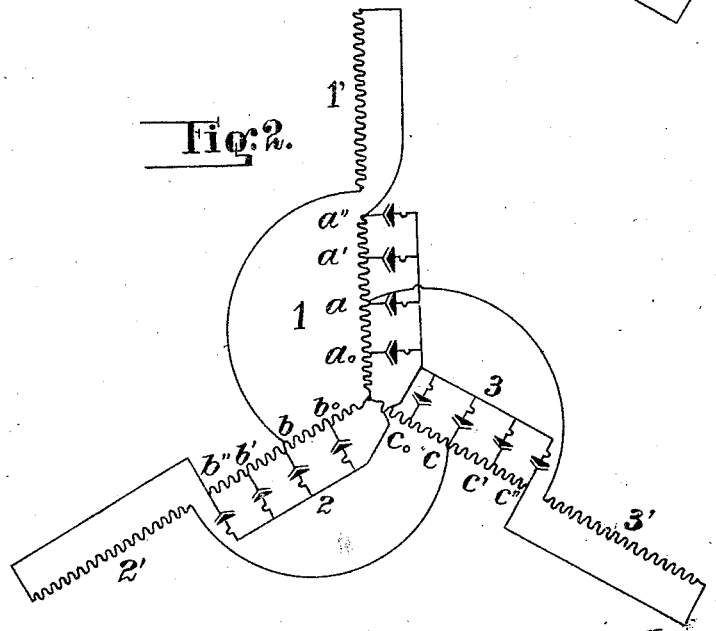
Inventor
Claudius Shenfer
by C. P. Goepel
Attorney.

Patented Aug. 28, 1928.

1,682,430

UNITED STATES PATENT OFFICE.

CLAUDIUS SHENFER, OF MOSCOW, RUSSIA.

ROTOR WINDING FOR ASYNCHRONOUS MOTORS WITHOUT STARTERS.

Application filed January 2, 1923, Serial No. 610,122, and in Germany March 20, 1922.

The Gorges system, a method by which asynchronous motors are started up without the use of motor starters, and by which the rotor windings are connected in opposition for the purpose of starting, suffers from the defect that the starting torque of a motor operated under this system is small. This defect is caused by the low power factor of the rotor currents.

The object of the present invention is to dispense with starting resistance or other auxiliary apparatus as in the Gorges system, and to obtain at the same time a large starting torque. This is accomplished by improving the rotor power factor whilst starting, which is brought about by arranging each phase of the polyphase rotor winding in two halves which during starting are arranged and connected in such a manner that these two halves of each phase oppose and approximately magnetically balance each other so as to form mainly an ohmic resistance. The connections between the halves of the winding are such that each of the two halves thus balanced form part of a circuit through which current is caused to flow by an electro-motive force generated in a part less than the half of another phase. This electro-motive force may be the whole electro-motive force produced by the part of the half of the phase connected in the said circuit or may be the resultant electro-motive force produced by the action of one half and a part of the other half of the phase mutually opposing and partially balancing. The two mutually opposing halves of each phase preferably have corresponding conductors located in the same slots.

The conversion from the starting to the running condition is effected without opening the rotor circuits, being brought about simply by applying short-circuiting connections to appropriate points so as to produce the equivalent of a polyphase winding having two or more short-circuiting connections between corresponding points of the phases.

This application of short-circuiting connections can be brought about by mechanical devices of well known types such as are employed for obtaining the final short circuit after starting up an asynchronous motor by the resistance method or by known devices of the centrifugal type which produce short-circuiting connections when the rotor has attained an appropriate speed.

This invention, as applied to a three-phase rotor, is illustrated diagrammatically by the accompanying drawings in which two methods of applying the principle are shown.

Figures 1 and 2 illustrate the arrangement of the rotor windings for the first method, whilst Figure 3 illustrates the arrangement of the rotor windings for the second method.

Figure 1 shows the general arrangement of a rotor winding; Figure 2 the arrangement of a rotor winding for the gradual speeding up of the motor; Figure 3 the general arrangement of a rotor winding.

Each rotor phase is halved and connected as shown in Figure 1. The first phase is formed by half-phases 1 and $1^1$, the second phase is formed by half-phases 2 and $2^1$, the third phase is formed by half-phases 3 and $3^1$. In order to obtain a high starting torque it is desirable that the corresponding conductors of the two halves of each phase should be arranged in the same slots.

In Figure 1 the half-phases 1, 2, 3 are star-connected, and the ends of phases 1, 2, 3 remote from the star-point are connected respectively to the ends of half-phases $1^1$, $2^1$, $3^1$ further from star-point $o$. The other ends of half-phases $1^1$, $2^1$, $3^1$ are connected respectively to the mid-points of half-phases 1, 2, 3 so that there are formed three overlapping closed circuits in which current is caused to flow by an electro-motive force generated only in a part ($oa$, $ob$, $oc$) of the half (1, 2, 3) of the phase. These circuits are as follows:—

$o$—$a$—$3^1$—3—1st circuit.
$o$—$b$—$1^1$—1—2nd circuit.
$o$—$c$—$2^1$—2—3rd circuit.

On summing the electro-motive forces induced in the circuits it is seen that the electro-motive forces induced in the complementary half-phases neutralize one another. Thus the effective electro-motive force in one of the circuits is due to one quarter of a whole phase, and in the circuit $o$—$a$—$3^1$—3 for instance only the electro-motive force induced in the part $o$—$a$ of the winding is effective, as the electro-motive forces induced in half-phases 3 and $3^1$ neutralize one another.

The current $i$ due to the electro-motive force induced in part $o$—$a$ of the winding flows through half-phases 3, $3^1$ in opposite senses, and in this manner the magnetic fields due to half-phases 3, $3^1$ are almost wholly compensated so long as the phase conductors are arranged as already indicated. Hence half-phases 3, $3^1$, constitute in this case an almost pure ohmic resistance for the current $i$, and serve as a starting rheostat for part $o$—$a$ of the winding, so that the phase displacement between the current $i$ and the electro-motive force induced in part $o$—$a$ of the winding is reduced, and the starting torque of the motor is increased.

All said with respect to the circuit $o$—$a$—$3^1$—3 applies equally well to circuits $o$—$b$—$1^1$—1 and $o$—$c$—$2^1$—2.

With the rotor windings connected as in Figure 1 the stator current at starting will approximately be equal to one quarter of the short-circuit stator current with the rotor windings connected as for running while the current would be one half, if the electromotive force generated in the whole half winding 1, 2, 3 were active.

If a yet smaller starting current is required the points $a$, $b$, $c$, of Figure 1 may be moved nearer star-point $o$. On the other hand a larger starting current may be obtained by moving the points $a$, $b$, $c$, further from star point $o$. The current value may be altered gradually by moving the points $a$, $b$, $c$, step by step.

When arranged as in Figure 1 for starting purposes the connections of the windings may readily be changed from the starting arrangement to that of running, after the machine has gained speed, simply by short-circuiting, step by step appropriate portions of the rotor winding.

Thus, referring to Figure 2, the separate parts of half-phases 1, 2, 3, may be short-circuited step by step by closing in sequence, as the rotor speeds up, the connections shown at $a_o$, $b_o$, $c_o$; those shown at $a$, $b$, $c$; those shown at $a^1$, $b^1$, $c^1$; those shown at $a^{11}$, $b^{11}$, $c^{11}$. The result is that half-phases 1—$1^1$, 2—$2^1$, 3—$3^1$ respectively no longer compensate one another magnetically, and so the ohmic resistance of the rotor compared relatively to the inductive resistance, becomes reduced step by step.

In small motors, where current-rushes at starting are not great, it may be possible merely to short-circuit the half-phases 1, 2, 3 at $a^{11}$, $b^{11}$, $c^{11}$.

If it is necessary to reduce the stator starting current yet more, the arrangement of rotor windings indicated in Figure 1, may be varied as shown in Figure 3.

In the arrangement of windings shown in Figure 3, the ends of half-phases $3^1$, $2^1$, $1^1$ are connected not to the mid-points of half-phases 1, 3, 2, but to the mid-points of half-phases $1^1$, $3^1$, $2^1$ respectively at points A, C, B, and this method of connection gives the following closed circuits:

1—$A^1$—A—$3^1$—3—1st circuit.
2—$B^1$—B—$1^1$—1—2nd circuit.
3—$C^1$—C—$2^1$—2—3rd circuit.

In each of these circuits the effective electro-motive force is that due to one quarter of a whole phase.

For instance, in the 1st circuit half the value of the electro-motive force induced in half-phase 1 is neutralized by that induced in the fourth part $A^1$ A of the whole phase whilst the electro-motive forces induced in half-phases $3^1$—3 oppose and neutralize each other.

The current $i$ due to the resultant electromotive force in the circuit under consideration flows in half-phases $3^1$, 3 in opposite senses so that the magnetic fields due to the half-phases are almost wholly compensated so long as the phase-conductors are arranged in the rotor slots as already indicated. In the portion of the circuit comprising windings 1, $A^1$—A the part $A^1$—A compensates the part 1 to the extent of one half.

All said in respect of the 1st circuit applies equally well to the 2nd and 3rd circuits.

By comparing the corresponding circuits of Figures 1 and 3 it may be seen that the ohmic resistance of each circuit of Figure 3 is greater than that of the respective circuit of Figure 1.

As in the first scheme the value of the starting current may be varied by moving the points of connection A, B, C of Figure 3 in one or other direction along the windings $1^1$, $2^1$, $3^1$, respectively. In fact, by moving points A, B, C nearer to points $A^1$, $B^1$, $C^1$, respectively, the values of the resultant electro-motive forces in the 1st, 2nd and 3rd closed circuits of the rotor winding are increased, together with the resulting currents. Conversely by moving points A, B, C further from points $A^1$, $B^1$, $C^1$, the value of the starting current is decreased.

The change of connection of rotor windings from starting to running condition may be accomplished after the same manner as that indicated by the aid of Figure 2 for the first scheme that is by short-circuiting, step by step, the portions of half-phases. $1^1$, $2^1$, $3^1$. For instance, with increase of speed the windings may be short-circuited first at points A, B, C, and afterwards at points $A^1$, $B^1$, $C^1$.

In small motors, where current-rushes at starting are not great, it may be possible straightway to short-circuit the windings at points $A^1$, $B^1$, $C^1$, without using any intermediate points of connection.

The half-phases 1, 2, 3, may gradually be short-circuited instead of the half-phases $1^1$, $2^1$, $3^1$.

Although the present invention is shown in these drawings as applied to three-phase rotor windings, it is to be understood that the invention is in no way limited to this particular case, and can be applied to multiphase rotor windings.

Having now particularly described and ascertained the nature of my said invention and in what manner the same is to be performed, I declare that what I claim is:

1. A polyphase rotor for an asynchronous motor in which each phase comprises two approximately equal windings arranged and connected in such a manner that the said two windings of each phase oppose and magnetically balance each other, a winding and a portion of the other winding of each phase being also connected in series with an adjacent phase whereby each phase comprises a high ohmic resistance and an electro-motive force generated in a part only of one of said windings is effective in each phase.

2. A polyphase rotor for an asynchronous motor in which each phase comprises two approximately equal windings arranged and connected in such a manner that the said two windings of each phase oppose and magnetically balance each other, a winding and a portion of the other winding of each phase being also connected in series with an adjacent phase whereby each phase comprises a high ohmic resistance and an electromotive force generated in a part only of one of said windings is effective in each phase, and means whereby one of said windings in each phase is short-circuited step by step during the starting period of the motor.

In testimony that I claim the foregoing as my invention, I have signed my name.

CLAUDIUS SHENFER.